(12) United States Patent
Kong et al.

(10) Patent No.: US 7,976,592 B2
(45) Date of Patent: Jul. 12, 2011

(54) PLATE TYPE REFORMER AND FUEL CELL SYSTEM INCLUDING THE REFORMER

(75) Inventors: Sang-Jun Kong, Yongin-si (KR); Zin Park, Yongin-si (KR); Dong-Myung Suh, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1106 days.

(21) Appl. No.: 11/367,398

(22) Filed: Mar. 6, 2006

(65) Prior Publication Data

US 2006/0234095 A1    Oct. 19, 2006

(30) Foreign Application Priority Data

Apr. 13, 2005 (KR) .................. 10-2005-0030566

(51) Int. Cl.
- B01J 7/00 (2006.01)
- H01M 8/06 (2006.01)
- C01B 3/36 (2006.01)
- C01B 6/24 (2006.01)
- C01B 3/02 (2006.01)
- C01B 3/24 (2006.01)

(52) U.S. Cl. ........ 48/61; 48/197 R; 423/644; 423/648.1; 423/650; 423/651

(58) Field of Classification Search ........ 48/61
See application file for complete search history.

(56) References Cited

U.S. PATENT DOCUMENTS 5,015,444 A * 5/1991 Koga et al. .................. 422/195

(Continued)

FOREIGN PATENT DOCUMENTS

EP    0 308 976    3/1989

(Continued)

OTHER PUBLICATIONS

EPO Machine Translation of EP1090878 A1 (Jul. 29, 2009).*

(Continued)

*Primary Examiner* — Alexa D Neckel
*Assistant Examiner* — Matthew J Merkling
(74) *Attorney, Agent, or Firm* — Robert E. Bushnell, Esq.

(57) ABSTRACT

In a plate type reformer and a fuel cell system including the plate type reformer, the plate type reformer includes: a plate type combustion reactor including a distributing plate having a distributing chamber with a plurality of distributing holes adapted to supply an oxidizing agent, and a combustion plate having a combustion chamber with an oxidizing catalyst layer adapted to generate heat energy in response to the oxidizing agent supplied through the distributing holes of the distributing plate reacting with fuel; a plate type preheater including a channel adapted to introduce a mixed fuel of fuel and water is introduced, the plate type preheater adapted to preheat the mixed fuel with the heat energy generated in the plate type combustion reactor; and a plate type reforming reactor with a reforming catalyst layer adapted to generate hydrogen gas from the mixed fuel preheated by the plate type preheater, the plate type reforming reactor effecting a reforming reaction using the heat energy of the plate type combustion reactor. The plate type combustion reactor is arranged and stacked between the plate type preheater and the plate type reforming reactor and adapted to directly transfer the heat energy from the plate type combustion reactor to the plate type preheater and the plate type reforming reactor.

43 Claims, 10 Drawing Sheets

U.S. PATENT DOCUMENTS

| | | | |
|---|---|---|---|
| 6,162,267 A * | 12/2000 | Priegnitz et al. | 48/199 FM |
| 6,569,553 B1 | 5/2003 | Koripella et al. | |
| 6,695,044 B1 * | 2/2004 | Symonds | 165/166 |
| 6,824,577 B2 * | 11/2004 | Deshpande | 48/127.9 |
| 2002/0071797 A1 * | 6/2002 | Loffler et al. | 422/190 |
| 2003/0049184 A1 | 3/2003 | Kimata et al. | |
| 2003/0072699 A1 * | 4/2003 | Tonkovich et al. | 422/190 |
| 2004/0148859 A1 * | 8/2004 | Kawamura et al. | 48/127.9 |

FOREIGN PATENT DOCUMENTS

| | | |
|---|---|---|
| EP | 1 090 878 | 4/2001 |
| JP | 64-052541 | 2/1989 |
| JP | 03-170301 | 7/1991 |
| JP | 05-253463 | 10/1993 |
| JP | 06-171902 | 6/1994 |
| JP | 06-171903 | 6/1994 |
| JP | 08-250146 | 9/1996 |
| JP | 10-182102 | 7/1998 |
| JP | 10-236802 | 9/1998 |
| JP | 10-334933 | 12/1998 |
| JP | 11-021104 | 1/1999 |
| JP | 2000-154001 | 6/2000 |
| JP | 2000-344503 | 12/2000 |
| JP | 2002-248357 | 9/2002 |
| JP | 2002-534350 | 10/2002 |
| JP | 2003-089502 | 3/2003 |
| JP | 3636272 | 6/2003 |

OTHER PUBLICATIONS

Transmittal Letter along with a Japanese Office action dated May 12, 2009 in corresponding Japanese Patent Application No. 2006-109763.

Korean Office Action of the Korean Patent Application No. 2005-30566, issued on Jun. 27, 2006.

European Search Report of the European Patent Application No. 06 11 2224, issued on Aug. 7, 2006.

The Office action from the Chinese Patent Office issued in Applicant's corresponding Chinese Patent Application No. 2006100681342 dated Aug. 31, 2007.

Japanese Office Action issued by Japanese Patent Office on Sep. 14, 2010 corresponding to Korean Patent Application No. 10-2005-0030566 and Request for Entry of the Accompanying Office Action attached herewith.

* cited by examiner

Contours of Static Temperature (K)

Contours of Static Temperature (K)

PLATE TYPE REFORMER AND FUEL CELL SYSTEM INCLUDING THE REFORMER

CLAIM OF PRIORITY

This application makes reference to, incorporates the same herein, and claims all benefits accruing under 35 U.S.C. §119 from an application for PLATE TYPE REFORMER AND FUEL CELL SYSTEM HAVING THE SAME earlier filed in the Korean Intellectual Property Office on 13 Apr. 2005 and there duly assigned Serial No. 10-2005-0030566.

BACKGROUND OF THE INVENTION

1. Field of the Invention

The present invention relates to a plate type reformer and a fuel cell system including the reformer, and more particularly, to a plate type reformer and a fuel cell system including the reformer, in which a heat of reaction in a combustion reactor is used to generate hydrogen gas, thereby enhancing reaction efficiency and thermal efficiency.

2. Description of the Related Art

A fuel cell is a power generation system that directly changes chemical reaction energy due to a reaction between hydrogen and oxygen into electrical energy, in which the hydrogen is contained in a hydro carbonaceous material such as methanol, ethanol, natural gas or the like.

The fuel cell is classified into a phosphate fuel cell, a molten carbonate fuel cell, a solid oxide fuel cell, a polymer electrolyte membrane fuel cell, an alkaline fuel cell, or etc. according to the kinds of electrolyte. Such fuel cells are operated on basically the same principle, but differ in the kind of fuel, the driving temperature, the catalyst, and the electrolyte, etc. from one another.

Among these fuel cells, the Polymer Electrolyte Membrane Fuel Cell (PEMFC) has advantages as compared with other fuel cells in that its output performance is excellent; its operation temperature is low; its start and response are quickly performed; and it can be widely used as a portable power source for an automobile, a distributed power source for a house and public places, a micro power source for electronic devices, etc.

The PEMFC includes a stack, a reformer, a fuel tank, and a fuel pump. The stack forms a main body of the fuel cell, and the fuel pump supplies fuel from the fuel tank to the reformer. The reformer reforms the fuel to generate hydrogen gas, and supplies the hydrogen gas to the stack. Thus, in the PEMFC, the fuel pump supplies the fuel from the fuel tank to the reformer, the reformer reforms the fuel to generate the hydrogen gas, and the stack electrochemically reacts the hydrogen gas with oxygen gas, thereby generating electrical energy.

In the foregoing fuel cell system, the stack has a structure in which several or dozens of unit cells including a Membrane Electrode Assembly (MEA) and a separator closely-contacting the opposite sides of the MEA are stacked. The MEA has a structure in which an anode and a cathode are attached with an electrolyte membrane therebetween. Furthermore, the separator, which is generally called a bipolar plate by those skilled in the art, is employed not only as a passage for separating the MEA and supplying the hydrogen gas and the oxygen gas needed for reaction of the fuel cell to the anode and the cathode of the MEA, but also as a conductor to electrically connect the anode and cathode of the MEA in series. Therefore, the hydrogen gas and the oxygen gas are respectively supplied to the anode and the cathode through the separator. In this process, the hydrogen gas is oxidized in the anode, and the oxygen gas is reduced in the cathode, so that electrical energy is generated as electrons generated at this time are moved, concomitantly generating heat and water.

The reformer is a device employing chemical catalytic reaction due to the heat energy to generate the hydrogen gas from the fuel containing hydrogen. In general, the reformer includes a combustion reactor to generate the heat energy, a reforming reactor to generate the hydrogen gas from the fuel using the heat energy, and a carbon monoxide eliminator to decrease the concentration of carbon monoxide contained in the hydrogen gas.

However, in the conventional reformer, the combustion reactor and the reforming reactor are placed separately from each other, so that the heat generated in the combustion reactor is transferred to the reforming reactor. Because the heat exchange is not directly performed between the combustion reactor and the reforming reactor of the conventional reformer, it takes relatively long time to preheat the reforming reactor, a heat-transferring path is relatively long, and so on. Thus, the conventional reformer has poor thermal efficiency.

Furthermore, because the combustion reactor and the reforming reactor of the conventional reformer are separately provided, there is a limit to reducing the size of the fuel cell system.

Also, the conventional fuel cell system separately preheats the fuel, which is supplied to the reformer at an initial starting, so that the energy must be consumed in preheating the fuel. Therefore, the performance efficiency of the fuel cell system is lowered.

SUMMARY OF THE INVENTION

Accordingly, it is an aspect of the present invention to provide a plate type reformer and a fuel cell system including the reformer, in which a heat of reaction in a combustion reactor is used to generate hydrogen gas, thereby enhancing reaction efficiency and thermal efficiency.

Another aspect of the present invention is to provide a plate type reformer and a fuel cell system including the reformer, in which the fuel cell system is compact in size.

In one aspect of the present invention, a plate type reformer is provided including: a plate type combustion reactor including a distributing plate having a distributing chamber with a plurality of distributing holes adapted to supply an oxidizing agent, and a combustion plate having a combustion chamber with an oxidizing catalyst layer adapted to generate heat energy in response to the oxidizing agent supplied through the distributing holes of the distributing plate reacting with fuel; a plate type preheater including a channel adapted to introduce a mixed fuel of fuel and water is introduced, the plate type preheater adapted to preheat the mixed fuel with the heat energy generated in the plate type combustion reactor; and a plate type reforming reactor with a reforming catalyst layer adapted to generate hydrogen gas from the mixed fuel preheated by the plate type preheater, the plate type reforming reactor effecting a reforming reaction using the heat energy of the plate type combustion reactor; wherein the plate type combustion reactor is arranged and stacked between the plate type preheater and the plate type reforming reactor and adapted to directly transfer the heat energy from the plate type combustion reactor to the plate type preheater and the plate type reforming reactor.

The plurality of distributing holes are preferably uniformly dispersed in the distributing chamber.

The plate type preheater preferably comprises a preheating plate including a channel on a first side thereof adapted to allow the mixed fuel to flow therethrough, and a cover plate closely contacting the first side of the preheating plate and adapted to define a passage with the channel; and wherein the plate type reforming reactor comprises a reforming reaction plate having a reforming reaction chamber with a reforming catalyst adapted to generate hydrogen gas from the mixed fuel preheated while passing through the channel of the preheating plate.

The cover plate preferably comprises: a first oxidizing inlet adapted to introduce an oxidizing agent; a first mixed fuel supplying hole adapted to supply the mixed fuel to the channel of the preheating plate; and a first fuel inlet through adapted to supply the fuel to the combustion plate; and wherein the preheating plate comprises: a second oxidizing agent inlet communicating with the first oxidizing agent inlet and adapted to supply the oxidizing agent to the distributing chamber of the distributing plate; a second mixed fuel supplying hole arranged in an end of the channel and adapted to supply the mixed fuel introduced in the channel to the reforming reaction plate; a second fuel inlet communicating with the first fuel inlet and adapted to supply the fuel to the combustion plate; and a first gasket adapted to isolate the second oxidizing agent inlet, the channel, and the second fuel inlet from one another.

The distributing plate preferably comprises: a third mixed fuel supplying hole communicating with the second mixed fuel supplying hole; a third fuel inlet communicating with the second fuel inlet; and a second gasket adapted to isolate the distributing chamber, the third mixed fuel supplying hole, and the third fuel inlet from one another; and wherein the combustion plate comprises: a fourth mixed fuel supplying hole communicating with the third mixed fuel supplying hole; a first discharging hole adapted to discharge reaction gas produced by a reaction of the oxidizing agent and the fuel in the combustion chamber; and a third gasket adapted to isolate the combustion chamber from the fourth mixed fuel supplying hole.

The reforming reaction plate preferably comprises: a second discharging hole communicating with the first discharging hole; a hydrogen gas discharging hole adapted to discharge the hydrogen gas generated by the reforming reaction in the reforming chamber; and a fourth gasket adapted to isolate the second discharging hole from the reforming reaction chamber.

The plate type reformer preferably further comprises a heating plate arranged under the reforming reaction plate and including a channel adapted to introduce and convey reaction gas produced in the combustion plate.

The plate type reformer preferably further comprises a heating plate arranged under the reforming reaction plate and including a channel adapted to introduce and convey reaction gas produced in the combustion plate and discharged through the second discharging hole; wherein the heating plate comprises a second hydrogen gas discharging hole communicating the hydrogen gas discharging hole, and a fifth gasket adapted to isolate the channel from the second hydrogen gas discharging hole.

The reforming catalyst layer preferably comprises grain catalysts.

The fourth mixed fuel supplying hole and the hydrogen gas discharging hole preferably comprise a mesh adapted to prevent the grain catalysts from scattering.

The reforming catalyst layer preferably comprises grain catalysts.

The fourth mixed fuel supplying hole and the hydrogen gas discharging hole preferably comprise a mesh adapted to prevent the grain catalysts from scattering.

The reforming catalyst layer preferably comprises washcoated catalysts.

The preheating plate preferably comprises a channel having a first end adapted to introduce the mixed fuel and a second end having a first mixed fuel supplying hole adapted to supply the mixed fuel to the reforming reaction plate; wherein the distributing plate comprises an inlet adapted to introduce an oxidizing agent in one side of the distributing chamber, and a second mixed fuel supplying hole communicating with the first mixed fuel supplying hole; wherein the combustion plate comprises an inlet and a corresponding outlet arranged in opposite sides of the combustion chamber, and a third mixed fuel supplying hole communicating with the second mixed fuel supplying hole; and wherein the reforming reaction plate comprising the reforming reaction chamber communicating with the third mixed fuel supplying hole, and a discharging hole adapted to discharge reformed hydrogen gas in one side of the reforming reaction chamber.

The first mixed fuel supplying hole, the second mixed fuel supplying hole and the third mixed fuel supplying hole preferably respectively comprise a plurality of first mixed fuel supplying holes, second mixed fuel supplying holes and third mixed fuel supplying holes.

The cover plate, the preheating plate, the distributing plate, the combustion plate and the reforming reaction plate are preferably attached to one another by welded edges thereof.

The reforming catalyst preferably comprises grain catalysts.

The third mixed fuel supplying hole preferably comprises a mesh arranged in the discharging hole thereof and adapted to prevent the grain catalysts from scattering.

The reforming catalyst layer preferably comprises grain catalysts.

The third mixed fuel supplying hole preferably comprises a mesh arranged in the discharging hole thereof and adapted to prevent the grain catalysts from scattering.

The reforming catalyst layer preferably comprises washcoated catalysts.

The cover plate, the preheating plate, the distributing plate and the combustion plate are preferably symmetrically arranged up and down with respect to the reforming reaction plate.

In another aspect of the present invention, a fuel cell system is provided including: a reformer adapted to generate hydrogen gas from fuel containing hydrogen by a chemical catalyst reaction due to heat energy; at least one power generator adapted to generate electrical energy by an electrochemical reaction of the hydrogen gas and oxygen; a fuel source adapted to supply the fuel to the reformer; and an oxidizing agent source adapted to supply an oxidizing agent to the power generator; wherein the reformer comprises: a plate type combustion reactor including a distributing plate having a distributing chamber with a plurality of distributing holes adapted to supply an oxidizing agent, and a combustion plate having a combustion chamber with an oxidizing catalyst layer adapted to generate heat energy in response to the oxidizing agent supplied through the distributing holes of the distributing plate reacting with fuel; a plate type preheater including a channel adapted to introduce a mixed fuel of fuel and water is introduced, the plate type preheater adapted to preheat the mixed fuel with the heat energy generated in the plate type combustion reactor; and a plate type reforming reactor with a reforming catalyst layer adapted to generate hydrogen gas from the mixed fuel preheated by the plate type preheater, the plate type reforming reactor effecting a reforming reaction using the heat energy of the plate type combustion reactor; wherein the plate type combustion reactor is arranged and stacked between the plate type preheater and the plate type reforming reactor and adapted to directly transfer the heat energy from the plate type combustion reactor to the plate type preheater and the plate type reforming reactor.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Hereinafter, exemplary embodiments according to the present invention are described with reference to the accompanying drawings.

Figure 1:
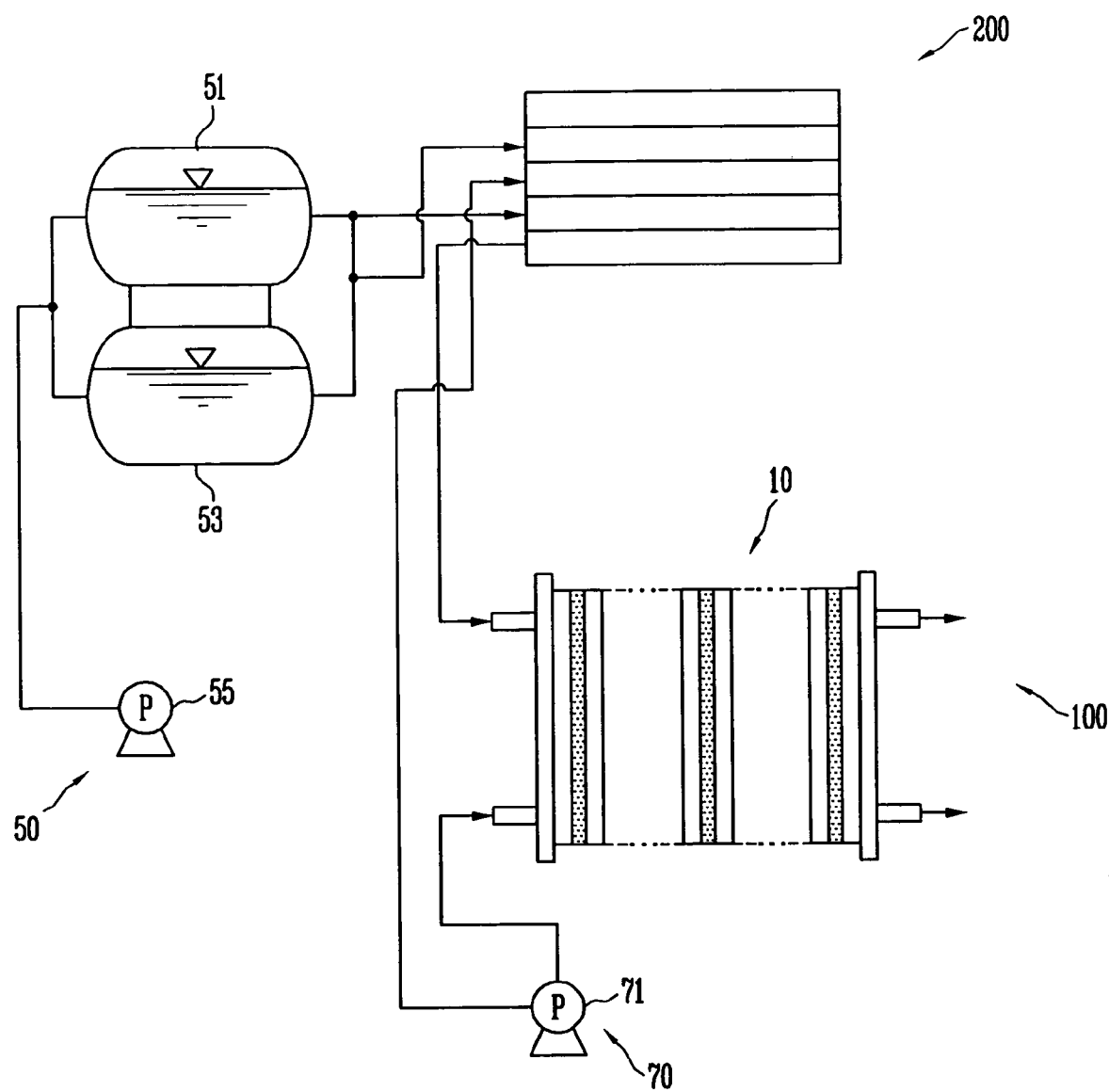
FIG. 1 is a schematic view of a fuel cell system according to an embodiment of the present invention.

FIG. 1 is a schematic view of a fuel cell system according to an embodiment of the present invention.

In a fuel cell system 100 according to an embodiment of the present invention, the fuel used for generating electrical energy can be understood in a narrow sense to be a fuel containing hydrogen, such as methanol, ethanol, or natural gas, and in a broad sense, water and oxygen are also defined as the fuel. For the sake of convenience, hereinafter, liquid fuel defined in the narrow sense will be called a fuel, and a mixture of the liquid fuel and water will be called a mixed fuel.

Furthermore, the fuel cell system 100 can employ pure oxygen gas stored in a separate storage as oxygen fuel to be reacted with hydrogen contained in the fuel, or employ air containing oxygen. Hereinafter, an example of using the air as the oxygen fuel is described.

Referring to FIG. 1, the fuel cell system 100 includes a reformer 200 to generate hydrogen gas from the liquid fuel, a stack 10 to change chemical reaction energy due to reaction between the hydrogen gas and oxygen into electrical energy, a fuel supply 50 to supply the fuel to the reformer 200, and an oxygen supply 70 to supply the oxygen to the stack 10 and the reformer 200.

For example, the fuel cell system 100 employs a PEMFC system that generates the hydrogen gas from the mixed fuel through the reformer 200, and supplies the hydrogen gas to the stack 10, thereby generating the electrical energy due to electrochemical reaction between hydrogen and oxygen.

The fuel supply 50 includes a first tank 51 to store the liquid fuel, a second tank 53 to store water, and a fuel pump 55 connected to both the first and second stacks 51 and 53. Furthermore, the oxygen supply 70 includes an air pump 71 to supply air at a predetermined pressure.

Figure 2:
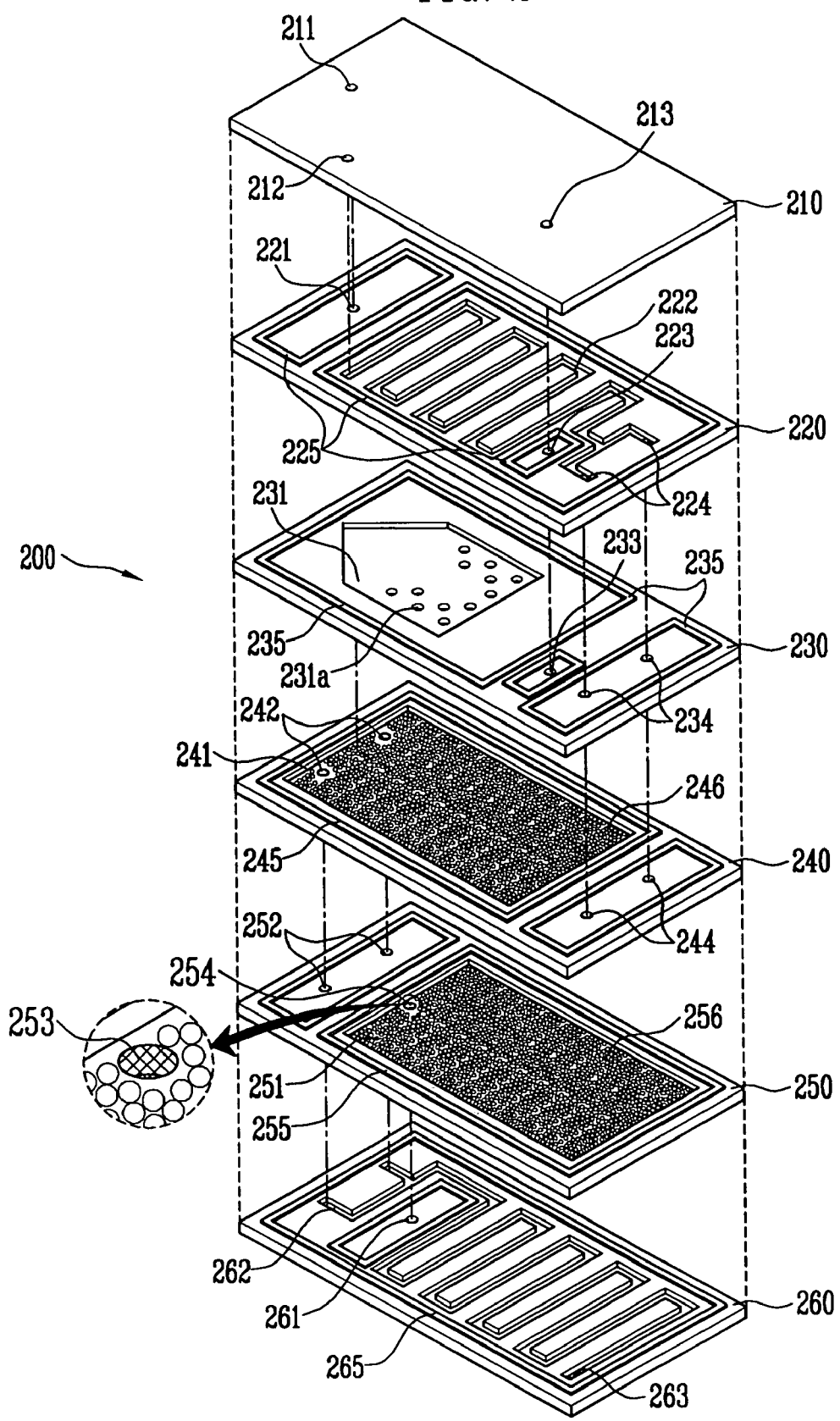
FIG. 2 is an exploded perspective view of a reformer according to a first embodiment of the present invention.
Figure 3:
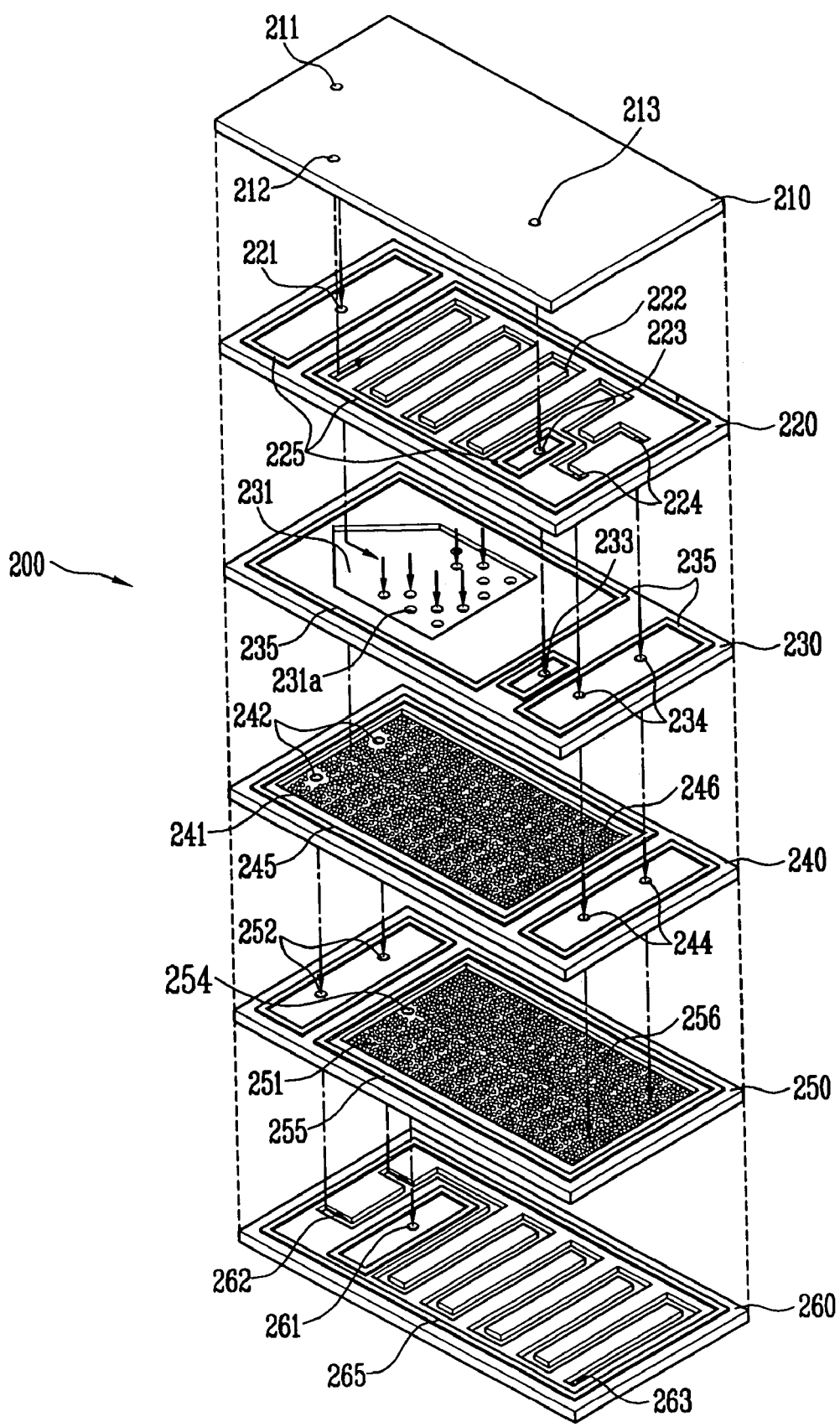
FIG. 3 is a view of the flow of air and fuel in the reformer of FIG. 2.

FIG. 2 is an exploded perspective view of a reformer according to a first embodiment of the present invention, and FIG. 3 illustrates a flow of air and fuel in the reformer of FIG. 2.

According to the first embodiment, as shown in FIG. 2, the reformer 200 has a structure in which plate type reactors are stacked, and includes a combustion reactor to generate heat energy by reacting an oxidizing agent with the fuel, a preheater to preheat the mixed fuel, consisting of the fuel and water, using the heat energy generated by the combustion reactor, and a reforming reactor to generate the hydrogen gas from the mixed fuel that has been preheated while passing through the preheater by a reforming reaction due to the heat energy of the combustion reactor.

The preheater includes a preheating plate 220 formed with a channel 222 allowing the mixed fuel to flow on a first side thereof, and a cover plate 210 closely contacting the first side of the preheating plate 220 and forming a passage due to the channel 222.

The channel 222 is elongated so that the fuel and water are sufficiently mixed therein. The channel 222 has a rectangularly bent shape.

According to the first embodiment of the present invention, the cover plate 210 is formed with a first mixed fuel supplying hole 212 through which the mixed fuel is introduced into the channel 222. The first mixed fuel supplying hole 212 is formed to communicate with a first end of the channel 222 when the cover plate 210 and the preheating plate 220 are stacked, so that the mixed fuel is introduced into the channel through the first mixed fuel supplying hole 212. Furthermore, a second mixed fuel supplying hole 224 is formed in a second end of the channel 222, so that the mixed fuel flows from the channel 222 to a reforming reaction plate 250.

Preferably, there are several second mixed fuel supplying holes 224 to allow the mixed fuel to flow easily. According to the first embodiment of the present invention, two second mixed fuel supplying holes 224 are provided.

Furthermore, the second end of the channel 222 is bent and branched from the center thereof as shown in FIG. 2, to cause the mixed fuel to flow equally toward two second mixed fuel supplying holes 224.

Also, the combustion reactor is placed under the preheating plate 220, in which the oxidizing agent and the fuel are reacted with each other and generate heat energy. The combustion reactor includes a distributing plate 230 having a distributing chamber 231 formed with a plurality distributing holes 231a through which the input oxidizing agent is equally distributed; and a combustion plate 240 having a combustion chamber 241 formed with an oxidizing catalyst layer 246 in which heat energy is generated when the oxidizing agent supplied through the distributing holes 231a of the distributing plate 230 is reacted with the fuel.

According to an embodiment of the present invention, air is used as the oxidizing agent. To supply the oxidizing agent to the combustion reactor, the cover plate 210 is formed with a first oxidizing agent inlet 211 through which the oxidizing agent is introduced, and the preheating plate 220 is formed with a second oxidizing agent inlet 221 communicating with the first oxidizing agent inlet 221 through which the oxidizing agent is supplied to the distributing chamber 231 of the distributing plate 230.

To supply the fuel to the combustion plate 240, the cover plate 210 is formed with a first fuel inlet 213, and the preheating plate 220 is formed with a second fuel inlet 223 communicating with the first fuel inlet 213 and through which the fuel is supplied to the combustion plate 230. Furthermore, the distributing plate 230 is formed with a third fuel inlet 233 communicating with the second fuel inlet 223 and through which the fuel is supplied to the combustion chamber 241 of the combustion plate 240.

The distributing chamber 231 is extended and has a predetermined angle to guide the oxidizing agent from the second oxidizing agent inlet 221 to be distributed. The distributing holes 231a are randomly provided in the distributing chamber 231.

The position, the diameter and the number of distributing holes 231a can be varied according to reaction conditions based on the flux or the flow rate of the fuel that flows into the combustion chamber 241 of the combustion plate 240.

The oxidizing agent flows into and spreads out in the distributing chamber 231, and then flows into the combustion chamber 241 of the combustion plate 240 through the plurality of distributing holes 231a formed on the bottom of the distributing chamber 231. The distributing holes 231a are dispersed on the bottom of the distribution chamber 231, so that the oxidizing agent and the fuel react with each other throughout the combustion chamber 241 of the combustion plate 240, thereby generating heat.

In the combustion reactor, the distributing holes 231a are dispersed on the bottom of the distributing chamber 231 to supply the oxidizing agent, so that the combustion reaction is performed throughout the combustion chamber 241. Thus, the combustion reaction, which is a very fast exothermic reaction, can be controlled to prevent hot spots, and so that the heat of combustion is uniformly dispersed in the combustion chamber 241.

The preheating plate 220 includes a first gasket 225 to seal off the second oxidizing agent inlet 221 through which the oxidizing agent is introduced; the channel 222 through which the mixed fuel flows; and the second fuel inlet 223 through which the fuel is supplied to the combustion plate 240, thereby sealing the second oxidizing agent inlet 221, the channel 222 and the second fuel inlet 223 from one another.

The first gasket 225 is used to prevent the oxidizing agent, the mixed fuel and the fuel from being mixed with each other. The first gasket 225 has a rectangular shape. Preferably, three first gaskets 225 are provided to respectively seal the second oxidizing agent inlet 221, the channel 222 and the second fuel inlet 223.

According to an embodiment of the present invention, as shown in FIG. 2, a plurality of first gaskets 225 are provided. However, the present invention is not limited thereto. Alternatively, the first gaskets can be formed as a single body.

Likewise, the distributing plate 230 includes a second gasket 235 to seal the distributing chamber 231, the third mixed fuel supplying hole 234 and the third fuel inlet 223 from one another.

Preferably, three second gaskets 235 are provided to respectively seal the distributing chamber 231, the third mixed fuel supplying hole 234 and the third fuel inlet 233. Furthermore, the second gaskets 235 can be formed as a single body.

Furthermore, the combustion chamber 241 of the combustion plate 240 is formed with a first discharging hole 242 to discharge reaction gas of the oxidizing agent and the fuel therethrough, and a fourth mixed fuel supplying hole 244 through which the mixed fuel is supplied from the second mixed fuel supplying hole 224 formed in the second end of the channel 222 to the reforming reaction plate 250 via the third mixed fuel supplying hole 234.

Thus, the combustion plate 240 includes a third gasket 245 to seal the combustion 241 from the fourth mixed fuel supplying hole 244.

Furthermore, the reforming reaction plate 250 is provided under the combustion plate 240, and has a reforming reaction chamber 251 formed with a reforming catalyst layer 256 to generate the hydrogen gas from the mixed fuel that has been preheated while passing through the channel 222 of the preheating plate 220.

The reforming reaction chamber 251 communicates with the fourth mixed fuel supplying hole 244 and receives the preheated mixed fuel. The mixed fuel supplied to the reforming reaction chamber 251 is reformed through the reforming catalyst layer 256.

According to the first embodiment of the present invention, the channel 222 of the preheating plate 220 and the reforming reaction plate 250 communicate with each other, so that the mixed fuel that has been preheated while passing through the preheating plate 220 is supplied to the reforming reaction chamber 251 of the reforming reaction plate 250.

In the plate type reformer with this configuration according to an embodiment of the present invention, the combustion plate 240 is interposed and stacked between the preheating plate 220 and the reforming reaction plate 250, so that the heat energy generated when the fuel is oxidized in the combustion reactor is directly transferred to the preheating plate 220 and the reforming reaction plate 250, thereby preheating the fuel.

Thus, in the plate type reformer according to an embodiment of the present invention, the preheating plate 220 is in contact with a top surface of the distributing plate 230 of the combustion reactor, so that the mixed fuel is preheated by the heat generated due to the combustion reaction in the combustion reactor before being supplied to the reforming reaction plate 250. Furthermore, the heat needed for the reforming reaction, which is an endothermic reaction, is achieved by the combustion reaction of the combustion plate 240 contacting the top surface of the reforming reaction plate 250.

In the combustion reactor, the distributing holes 231a for supplying the oxidizing agent are dispersed so that the combustion reaction is performed throughout the combustion chamber 241. Therefore, the heat needed for vapor reforming reaction is uniformly supplied throughout the combustion chamber 241, and thus, the reforming reaction is uniformly performed throughout the reforming reaction plate 250. The reforming reaction plate 250 is formed with a second discharging hole 252 communicating with the first discharging hole 242, and the reforming reaction chamber 251 is formed with a hydrogen gas discharging hole 254 to discharge the hydrogen gas generated by the reforming reaction. Furthermore, the reforming reaction plate 250 includes a fourth gasket 255 to seal the second discharging hole 252 from the reforming reaction chamber 252.

Furthermore, according to the first embodiment of the present invention, a heating plate 260 is additionally provided under the reforming reaction plate 250. The heating plate 260 is formed with a channel 262 through which the reaction gas is introduced from the combustion plate 240.

The heating plate 260 is formed with a second hydrogen gas discharging hole 261 communicating with the hydrogen gas discharging hole 254, and includes a fifth gasket 265 to seal the channel 262 from the second hydrogen gas discharging hole 261.

The channel 262 has a reaction gas supplying hole 263 at a first end, through which the reaction gas is supplied to the stack.

According to the first embodiment of the present invention with the heating plate 260, the reaction gas from the combustion plate 240 transfers heat to the reforming reaction plate 250, thereby enhancing the reforming reaction.

In the plate type reformer with this configuration, the reforming catalyst layer 256 is filled with grain catalysts to simplify a complicated catalyst coating process.

To prevent the grain catalysts from scattering, the fourth mixed fuel supplying hole 244 or the hydrogen gas discharging hole 254 is preferably covered with a mesh 253.

The mesh 253 is shaped like a net. The fourth mixed fuel supplying hole 244 or the hydrogen gas discharging hole 254 can have a structure including a projection or a rib to hold the mesh 253 to the fourth mixed fuel supplying hole 244 or the hydrogen gas discharging hole 254.

Also, the oxidizing catalyst layer 246 is filled with the grain catalysts.

According to an embodiment of the present invention, the combustion reactor and the reforming reactor are filled with the grain catalysts. However, the present invention is not limited thereto. Alternatively, the oxidizing catalyst layer 246 and the reforming catalyst layer 256 can be formed by coating the catalyst thereon.

Besides, there are various coating methods for the catalysts. For example, a washcoating method can form the catalyst layer thinly, so that the amount of catalysts is reduced, thereby allowing the reformer to have a compact size, and enhancing heat transferring efficiency.

Furthermore, the plate type reformer according to an embodiment of the present invention additionally includes a Preferential Oxidation (PROX) reactor (not shown) to eliminate a byproduct such as carbon monoxide produced in the reforming reaction.

The PROX reactor is provided outside the reformer, or connected to the heating plate 260 and integrally provided in the reformer. However, the present invention is not limited thereto.

In the plate type reformer with this configuration, as shown in FIG. 3, the fuel and water are mixed through the channel 222 of the preheating plate 220, and the mixed fuel and water are preheated using heat generated in the combustion reactor by the combustion reaction. Then, the preheated mixed fuel is supplied to the reforming reaction plate 250 via the second mixed fuel supplying hole 224, the third mixed fuel supplying hole 234 and the fourth mixed fuel supplying hole 244.

The mixed fuel supplied to the reforming reaction chamber 251 of the reforming reaction plate 250 is then reformed using heat of combustion of the combustion reaction in the combustion plate 240 contacting the top surface of the reforming reaction plate 250.

Thus, in the plate type reformer according to an embodiment of the present invention, the reforming reactor, the combustion reactor and the preheater are formed as plates and stacked, thereby effectively controlling the heat of reaction.

Furthermore, the distributing holes 231a are dispersed on the bottom of the distribution chamber 231 to supply the oxidizing agent, so that the combustion reaction is performed throughout the combustion chamber 241. Therefore, it is possible to control the combustion reaction, which is a very fast exothermic reaction, to prevent hot spots.

Also, heat needed for the vapor reforming reaction is uniformly supplied throughout the combustion chamber 241, and thus the reforming reaction is uniformly performed throughout the reforming reaction plate 250.

In the first embodiment, the reforming reaction chamber 251 is formed in the reforming reaction plate 250. However, the present invention is not limited thereto. Alternatively, a micro channel can be formed instead of the reforming reaction chamber 251. If a micro channel is formed, the size of the reactor and the usage of the catalyst can be greatly decreased.

Figure 4:
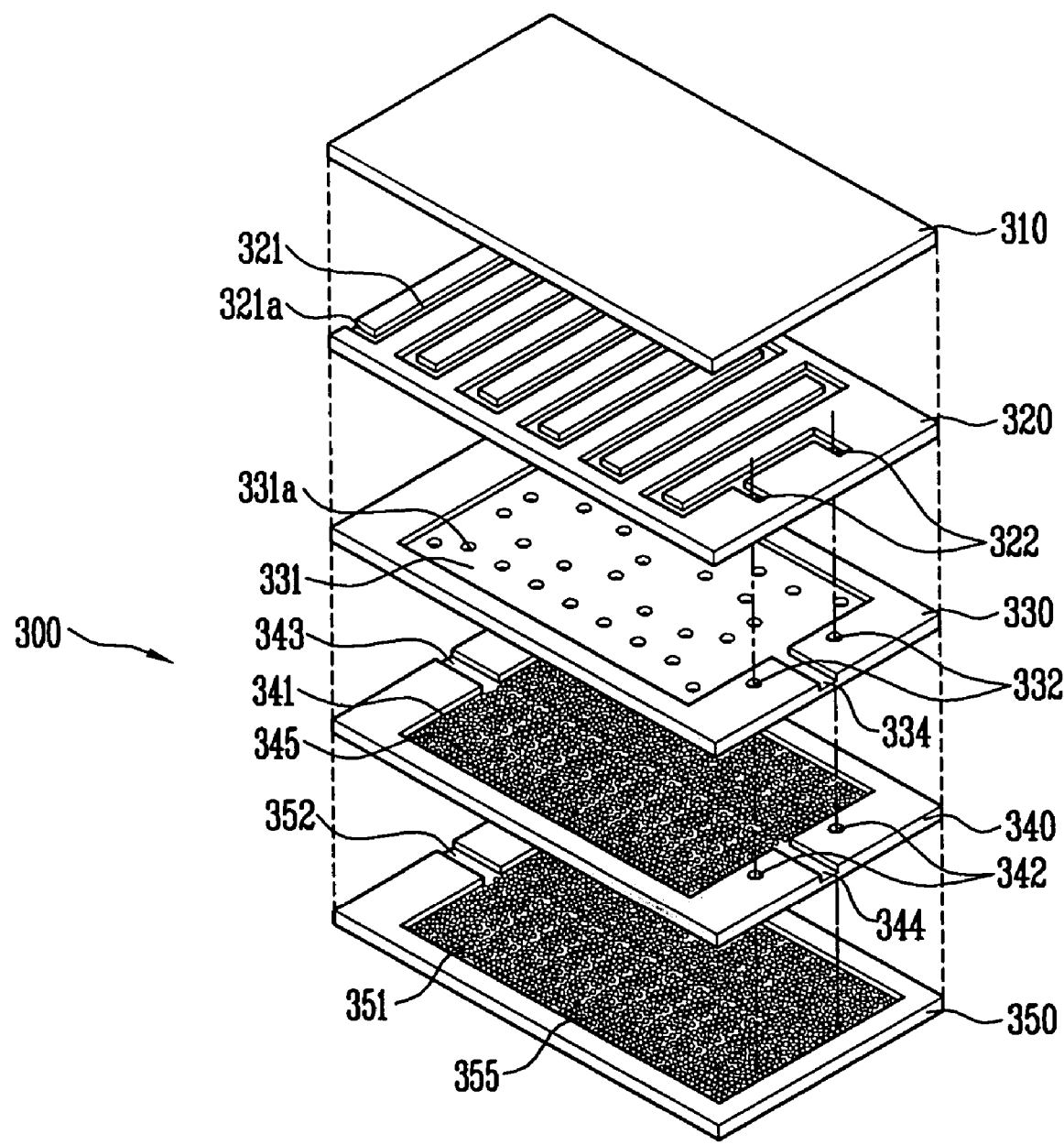
FIG. 4 is an exploded perspective view of a reformer according to a second embodiment of the present invention.
Figure 5:
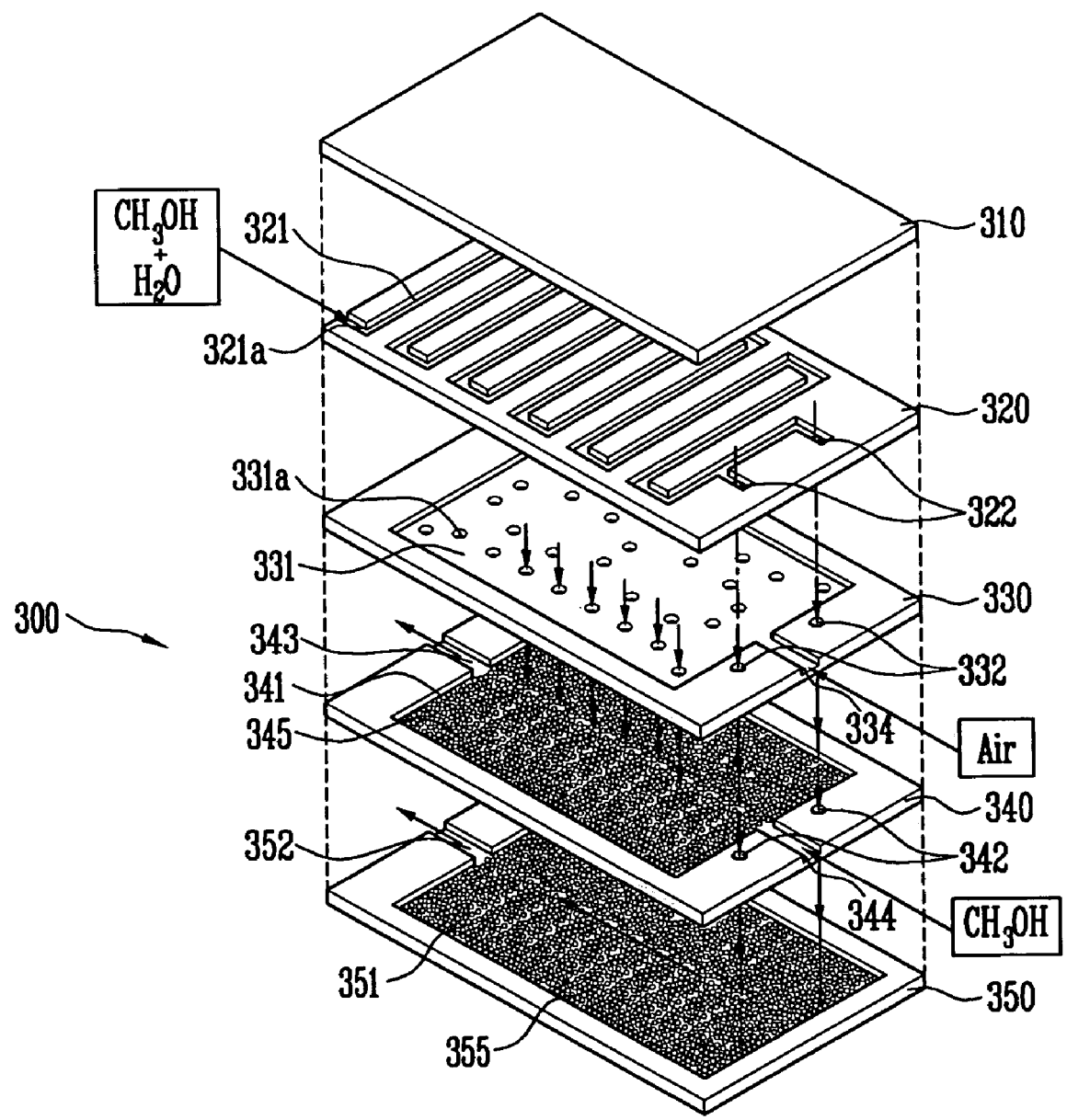
FIG. 5 is a view of the flow of air and fuel in the reformer of FIG. 4.

FIG. 4 is an exploded perspective view of a reformer according to a second embodiment of the present invention, and FIG. 5 is a view of the flow of air and fuel in the reformer of FIG. 4. According to the second embodiment of the present invention, the reformer includes a preheating plate 320 formed with a channel 321 allowing the mixed fuel to flow on a first side thereof; a cover plate 310 closely contacting the first side of the preheating plate 320 and forming a passage with the channel 321; a distributing plate 330 having a distributing chamber 331 formed with a plurality distributing holes 331a through which the input oxidizing agent is equally distributed; a combustion plate 340 having a combustion chamber 341 formed with an oxidizing catalyst layer 345 in which heat energy is generated when the oxidizing agent supplied through the distributing holes 331a of the distributing plate 330 is reacted with the fuel; and a reforming reaction plate 350 having a reforming reaction chamber 351 formed with a reforming catalyst layer 355 to generate the hydrogen gas from the mixed fuel preheated while passing through the channel 321 of the preheating plate 320.

The cover plate 310, the preheating plate 320, the distributing plate 330, the combustion plate 340 and the reforming reaction plate 350 are attached together by welding the edges thereof.

In the preheating plate 320, the channel 321 has a first end used as an inlet 321a through which the mixed fuel is introduced, and a second end used as a first mixed fuel supplying hole 322 through which the mixed fuel is supplied to the reforming reaction plate 350.

In the distributing plate 330, the distributing chamber 331 including an inlet 334 through which the oxidizing agent is introduced, and a second mixed fuel supplying hole 332 communicating with the first mixed fuel supplying hole 322.

In the combustion plate 340, the combustion chamber 341 is formed with a fuel inlet 344 and a corresponding fuel outlet 343 at opposite sides thereof, and a third mixed fuel supplying hole 342 communicating with the second fuel supplying hole 332.

The reforming reaction plate 350 includes the reforming reaction chamber 351 communicating with the third mixed fuel supplying hole 342. The reforming reaction chamber 351 is formed with a discharging hole 352 at one side thereof to discharge reformed hydrogen gas.

Preferably, there are several first mixed fuel supplying holes 322, second mixed fuel supplying holes 332 and third mixed fuel supplying holes 342.

Preferably, the oxidizing catalyst layer 345 and the reforming catalyst layer 355 are filled with grain catalysts. To prevent the grain catalysts from scattering, the second mixed fuel supplying hole 332 or the third mixed fuel supplying hole 342 can be preferably covered with a mesh (not shown). Furthermore, the fuel inlet 344, the fuel outlet 343 and the discharging hole 352 can be covered with the mesh.

The reformer with this configuration according to the second embodiment of the present invention is operated as follows.

The oxidizing agent is introduced into the distributing plate 330 through the inlet 334, and then supplied to the combustion plate 340 via the distributing holes 331a dispersed on the distributing chamber 331.

At the same time, the fuel is supplied to the combustion plate 340, so that the liquid fuel and the oxidizing agent are reacted by an oxidizing-catalyst reaction through the oxidizing catalyst layer of the combustion plate 340. Through this process, the liquid fuel and air are burned through the oxidizing-catalyst reaction, thereby generating a heat of reaction.

The heat of reaction is transferred to the preheating plate 320 contacting the distributing plate 330, and preheats the mixed fuel flowing in the channel 321 of the preheating plate 320.

Thus, the preheated mixed fuel is supplied to the reforming reaction plate 350 via the first mixed fuel supplying hole 332, the second mixed fuel supplying hole 332, and the third mixed fuel supplying hole 342.

The combustion plate 340 directly contacts the top surface of the reforming reaction plate 350, so that the reforming reaction plate 350 receives the heat of reaction from the combustion plate 340, and thus, in the reactor 351, the mixed fuel is reformed by the reforming catalyst layer 355, thereby generating the hydrogen gas containing carbon dioxide and hydrogen.

According to the second embodiment of the present invention, the distributing holes 331a for supplying the oxidizing agent are dispersed on the bottom of the distributing chamber 331, so that the combustion reaction is performed throughout the combustion chamber 341. Thus, the combustion reaction, which is a very fast exothermic reaction, can be controlled to thereby prevent hot spots, and the heat of combustion needed for a vapor reforming reaction is uniformly dispersed throughout the combustion chamber 341.

Below, the combustion reactor with the distributing plate 330 is compared in more detail with the conventional combustion reactor.

Figure 6A:
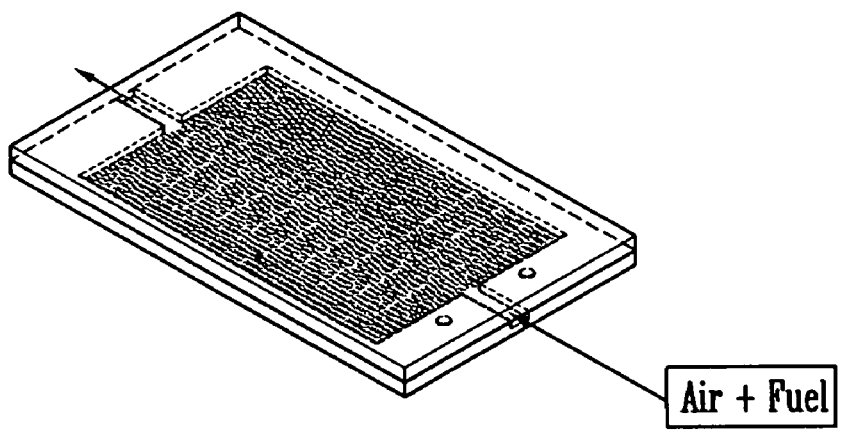
FIGS. 6A and 6B are views of a conventional combustion reactor and its temperature distribution.
Figure 6B:
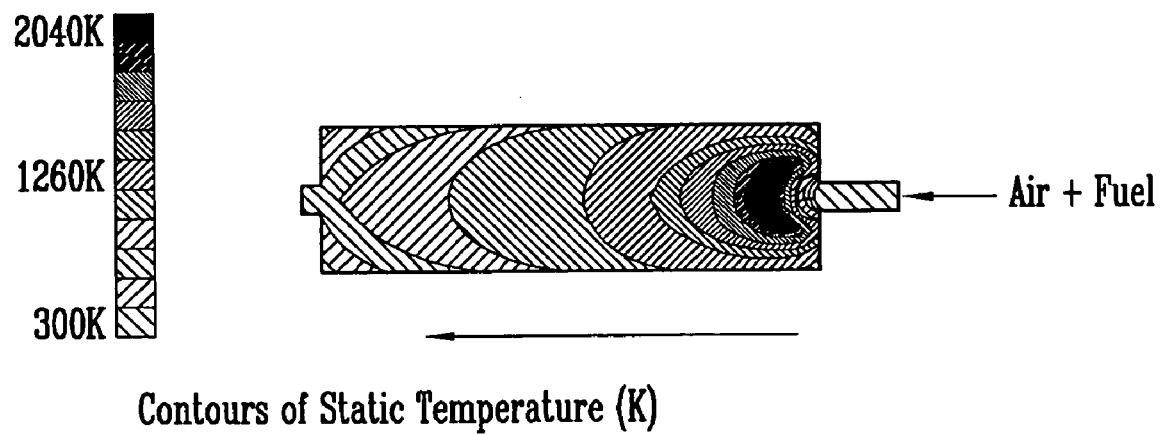
Figure 7A:
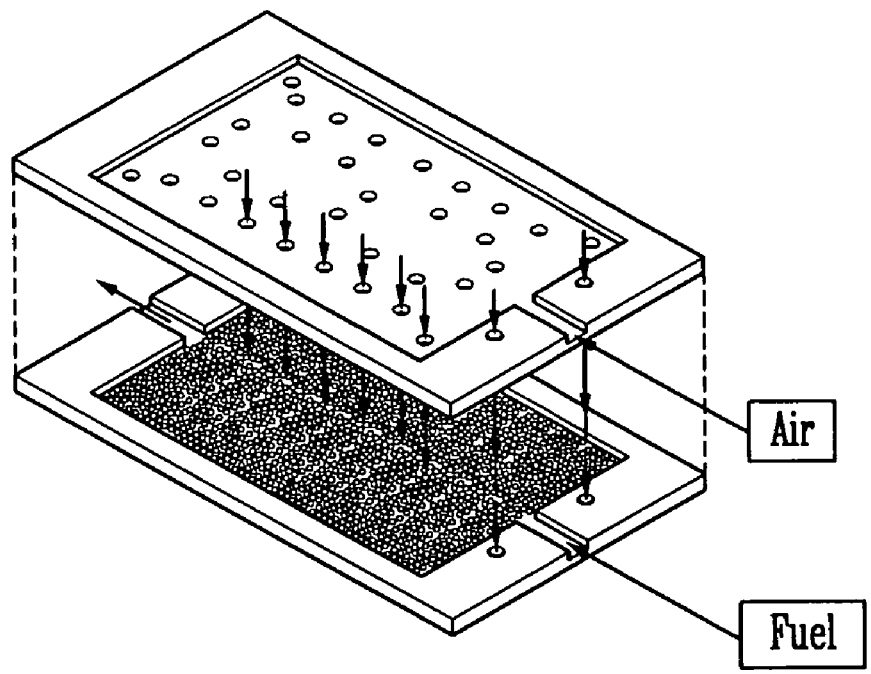
FIGS. 7A and 7B are views of a combustion reactor according to an embodiment of the present invention and its temperature distribution.
Figure 7B:
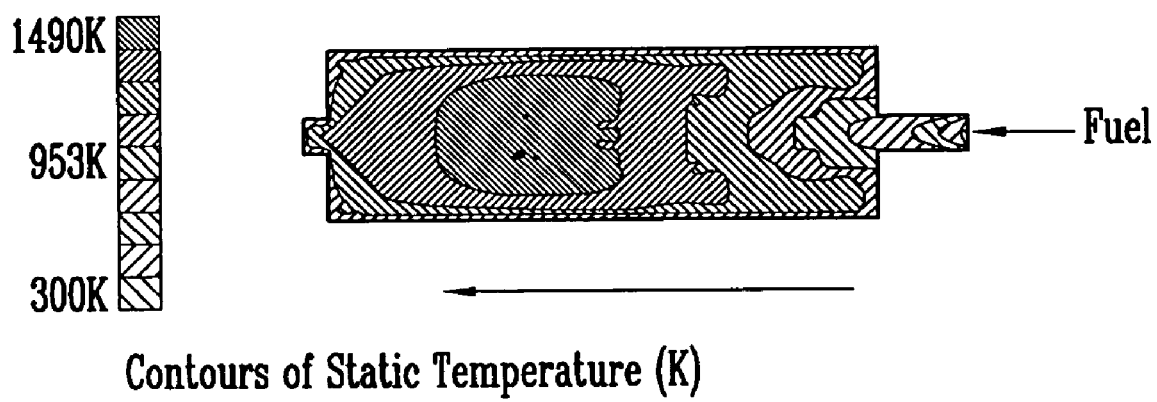

FIGS. 6A and 6B are views of a conventional combustion reactor and its temperature distribution, and FIGS. 7A and 7B are views of a combustion reactor according to an embodiment of the present invention and its temperature distribution. The conventional combustion reactor (refer to FIG. 6A) has a structure in which air and fuel are introduced through one inlet.

That is, the empty space of the combustion chamber is filled with catalyst, and air and fuel are introduced at the same time. In the conventional combustion reactor, a simulation result of temperature distribution has a maximum temperature of 2040K and a minimum temperature of 300K as shown in FIG. 6B, and hence a delta T is 1740K.

Particularly, in the conventional combustion reactor, the temperature around the inlet for introducing air and fuel is as high as 2040K, and the temperature increases as it gets closer to the outlet. Thus, the low temperature region about 300K is largely formed. Consequently, it means that a very fast exothermic reaction, i.e., the combustion reaction, is performed around the inlet.

Thus, in the conventional combustion reactor, the temperature of a local area increases so that high temperature hot spots are generated, and the efficiency of the catalyst reaction is lowered.

On the other hand, the combustion reactor according to an embodiment of the present invention, as shown in FIG. 7A, separately includes a distributing plate and a combustion plate, thereby supplying air and fuel separately. Furthermore, the air is equally supplied to the combustion plate through distributing holes formed on the distributing plate, so that the combustion reaction is performed throughout the combustion plate.

In the combustion reactor according to an embodiment of the present invention, a simulation result of temperature distribution has a maximum temperature of 1490K and a minimum temperature of 300K as shown in FIG. 7B, and hence a delta T is 1190K.

The minimum temperature of 300K is shown in the inlet of the combustion plate, and the inner temperature of the combustion chamber, in which the combustion reaction is performed, ranges from 953K to 1490K, so that the temperature is approximately equal throughout the combustion reactor.

Thus, according to an embodiment of the present invention, the distributing plate formed with the distributing holes is used so that the temperature deviation is greatly decreased, and the temperature of hot spots is decreased. Consequently, temperature distribution are uniformly formed and maintained by not only suppressing a side reaction but also dispersing the hot spots.

Figure 8:
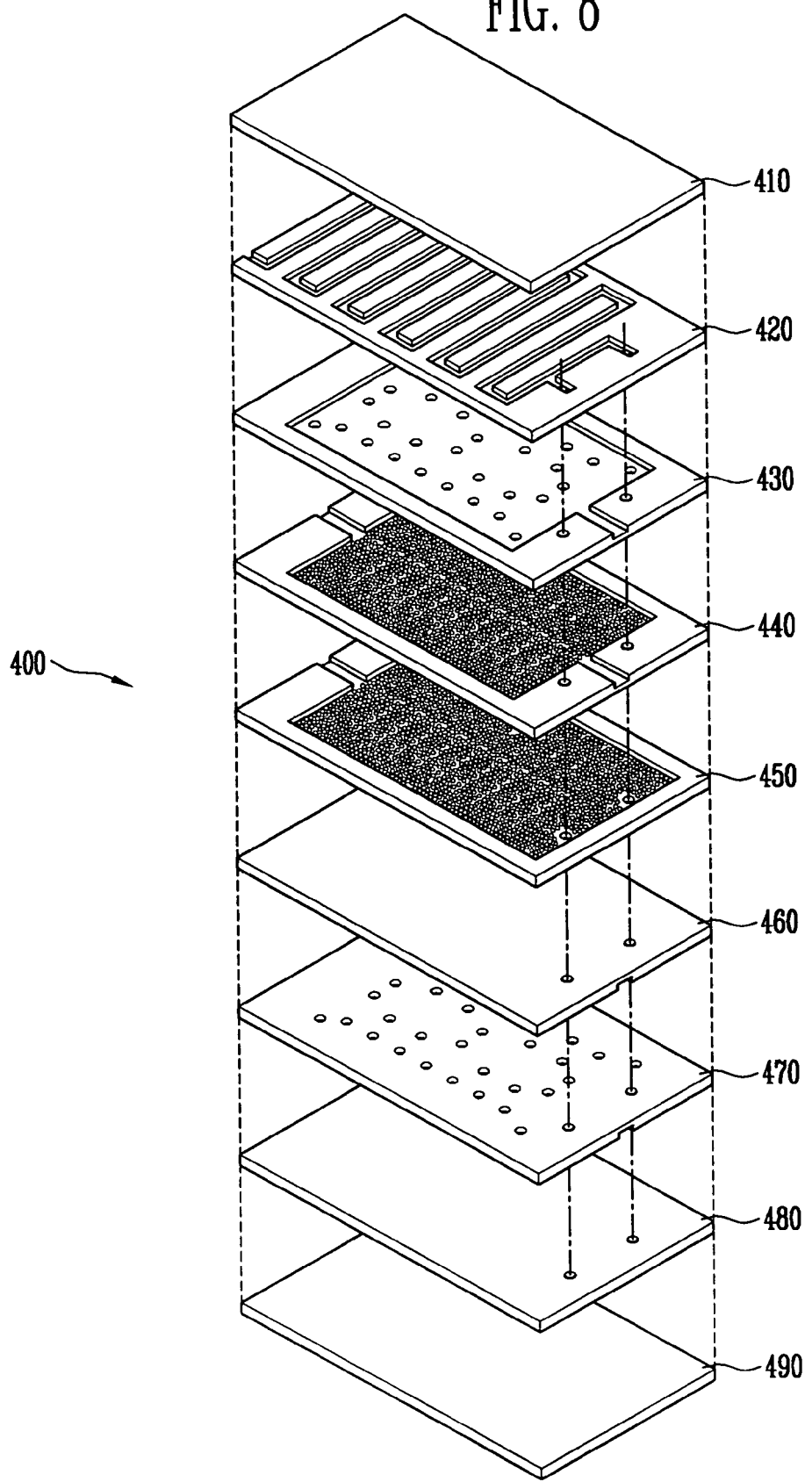
FIG. 8 is an exploded perspective view of a reformer according to a third embodiment of the present invention.
Figure 9:
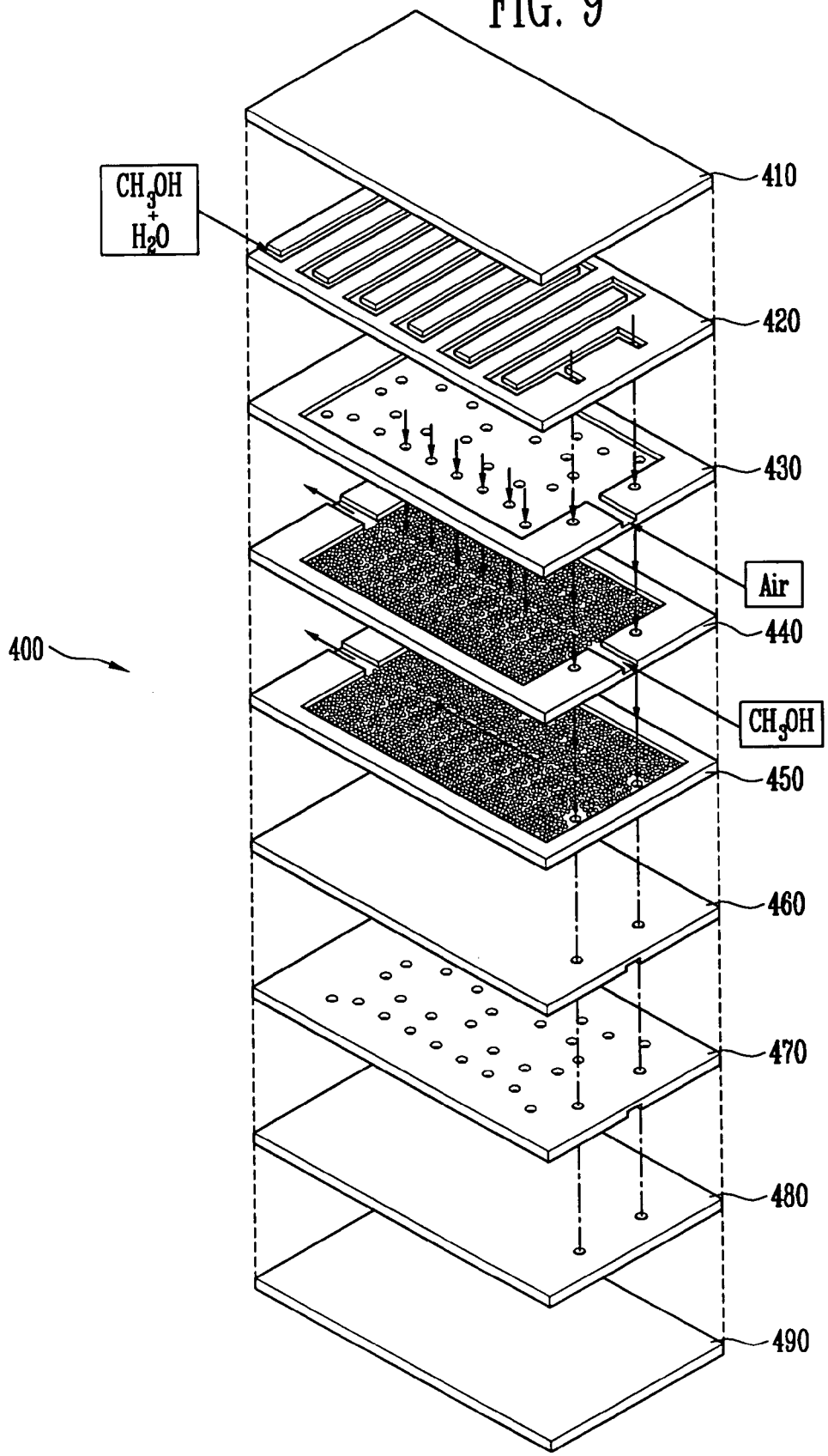
FIG. 9 is a view of the flow of air and fuel in the reformer of FIG. 8.
Figure 10:
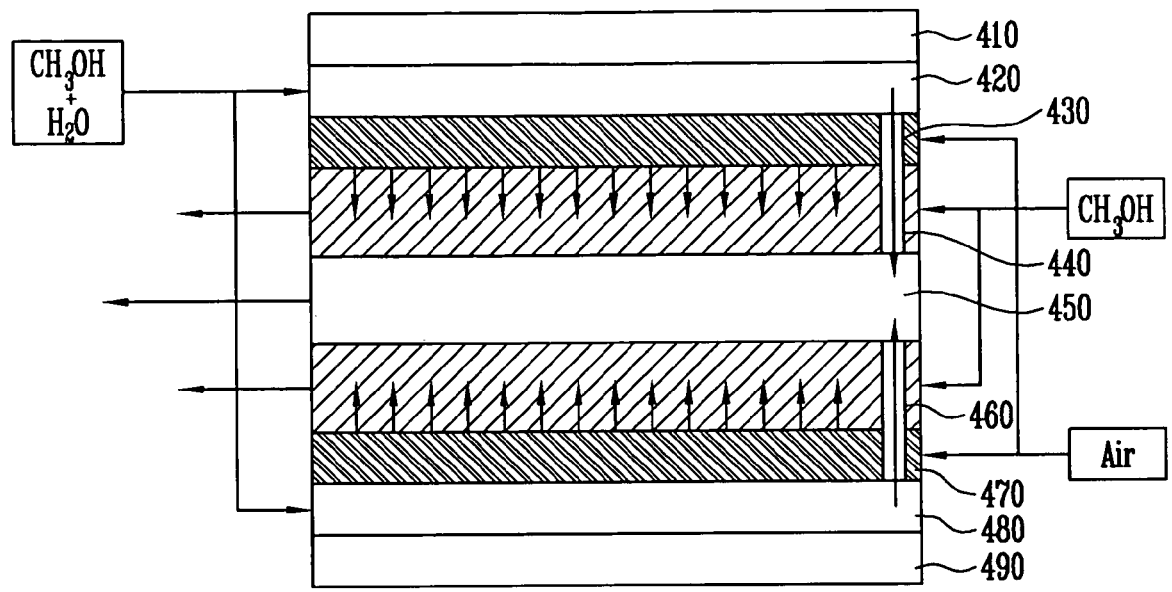
FIG. 10 is a schematic view of the flow of air and fuel in the reformer according to the third embodiment of the present invention.

FIG. 8 is an exploded perspective view of a reformer according to a third embodiment of the present invention. A cover plate 410, a preheating plate 420, a distributing plate 430 and a combustion plate 440 are provided symmetrically up and down with respect to a reforming reaction plate 450.

That is, the cover plate 410, the preheating plate 420, the distributing plate 430 and the combustion plate 440 are stacked above the reforming reaction plate 450. Furthermore, a cover plate 490, a preheating plate 480, a distributing plate 470, and a combustion plate 460 are stacked in reverse order under the reforming reaction plate 450. Thus, the plates are symmetrically stacked up and down with respect to the reforming reaction plate 450.

According to the third embodiment of the present invention, heat sources are provided above and below the reforming reaction plate 450, so that a reforming reaction is more smoothly performed. Furthermore, a channel for the mixed fuel or a structure for supplying the oxidizing agent has the same configuration as the second embodiment, so that repetitive descriptions have been obviated.

Using the plate type reformer with this configuration according to the third embodiment of the present invention, the fuel cell system operates as follows.

First, a fuel pump 55 is driven at initial starting, so that the liquid fuel stored in the first tank 51 is supplied to the combustion plate 340. At the same time, the air pump 71 is driven to supply air to the inner space of the distributing plate 330.

The liquid fuel and air are reacted by the oxidizing catalyst reaction through the oxidizing catalyst layer of the combustion plate 340. Through this process, the liquid fuel and air are burned through the oxidizing-catalyst reaction, thereby generating a heat of reaction. The heat of reaction is transferred to the preheating plate 320 and the reforming reaction plate 350.

The fuel pump 55 is driven to supply the liquid fuel stored in the first tank 51 and water stored in the second tank 53 to the preheating plate 320. The mixed fuel consisting of the liquid fuel and water is passed through the channel 321 of the preheating plate 320 and then preheated by the heat of the combustion plate 340 because the preheating plate 320 contacts the distributing plate 330.

The preheated mixed fuel is supplied to the reforming reaction plate 350 via the first mixed fuel supplying hole 322, the second mixed fuel supplying hole 332, and the third mixed fuel supplying hole 342. The mixed fuel absorbs the heat while passing through the reforming catalyst layer 355, and at the same time, the mixed fuel is reformed through the reforming catalyst layer 355 in the reforming reaction chamber 351, thereby generating hydrogen gas containing carbon dioxide and hydrogen.

The generated hydrogen gas is supplied to the stack 10, and at the same time, the air pump 71 is driven to supply air to the stack 10.

The hydrogen gas is supplied to the anode of the MEA through a hydrogen passage of the separator. Furthermore, the air is supplied to the cathode of the MEA through an air passage of the separator.

The anode reduces the hydrogen gas into electrons and protons (hydrogen ions) through an oxidation reaction. Then, the protons move to the cathode through the electrolyte membrane, and the electrons move to the cathode electrode of a neighboring MEA through the separator rather than the electrolyte membrane. The flux of electrons generates an electric current, and heat and water are generated as byproducts.

As described above, the present invention provides a plate type reformer and a fuel cell system including the reformer, in which distributing holes for supplying an oxidation agent are dispersed on a bottom of a distributing chamber, so that a combustion reaction is performed throughout a combustion chamber, so that a very fast exothermic combustion reaction can be controlled, hot spots are prevented, and the heat of combustion is dispersed throughout the combustion chamber, thereby achieving a uniform reforming reaction.

Furthermore, the reformer according to an embodiment of the present invention has an improved structure of transferring heat energy quickly and effectively using the heat energy in various reactions, so that the thermal efficiency and the driving performance of the whole fuel cell system are further enhanced and the whole fuel cell system can have a compact size.

While the present invention has been described in connection with certain exemplary embodiments, it is to be understood by those skilled in the art that the present invention is not limited to the disclosed embodiments, but, on the contrary, is intended to cover various modifications included within the spirit and scope of the appended claims.

What is claimed is:

1. A plate type reformer, comprising:
   a plate type combustion reactor including a distributing plate including a distributing chamber having a plurality of distributing holes, and a combustion plate including a combustion chamber having an oxidizing catalyst layer, the combustion chamber being connected to the distribution chamber through the distributing holes, an oxidizing agent supplied to the distributing chamber being supplied to the combustion chamber through the distributing holes, the combustion chamber generating heat energy from reaction of the oxidizing agent and a fuel, the plurality of distributing holes being uniformly dispersed in the distributing chamber;
   a plate type preheater disposed above the plate type combustion reactor and including a channel, the plate type preheater being preheated by the heat energy generated in the plate type combustion reactor, the plate type preheater comprising a preheating plate and a cover plate, the channel of the plate type preheater being formed on a first side of the preheating plate, the cover plate contacting the first side of the preheating plate and defining a passage with the channel, the channel having a first end and a second end, a mixed fuel of fuel and water being introduced into the channel through the first end and flowing to the second end through the passage, the second end having at least two branches, the mixed fuel of fuel and water flowing into the distributing plate at the at least two branches;
   a plate type reforming reactor disposed below the plate type combustion reactor and having a reforming catalyst layer to generate hydrogen gas from the mixed fuel supplied from the plate type preheater, the plate type reforming reactor being heated by the heat energy generated in the plate type combustion reactor; and
   a heating plate disposed below the plate type reforming reactor and including a channel, a reaction gas of the oxidizing agent and the fuel being supplied to the channel of the heating plate from the combustion chamber, the reaction gas flowing through the channel of the heating plate transferring heat energy of the reaction gas to the plate type reforming reactor.

2. The plate type reformer according to claim 1, wherein the plate type reforming reactor comprises a reforming reaction plate having a reforming reaction chamber including the reforming catalyst.

3. The plate type reformer according to claim 2, wherein the cover plate comprises: a first oxidizing agent inlet adapted to introduce the oxidizing agent; a first mixed fuel supplying hole adapted to supply the mixed fuel to the channel of the preheating plate; and a first fuel inlet through adapted to supply the fuel to the combustion plate; and
   wherein the preheating plate comprises: a second oxidizing agent inlet communicating with the first oxidizing agent inlet and adapted to supply the oxidizing agent to the distributing chamber of the distributing plate; a second mixed fuel supplying hole arranged at each of the at least two branches of the second end of the channel and adapted to supply the mixed fuel introduced in the channel to the reforming reaction plate; a second fuel inlet communicating with the first fuel inlet and adapted to supply the fuel to the combustion plate; and a first gasket adapted to isolate the second oxidizing agent inlet, the channel, and the second fuel inlet from one another.

4. The plate type reformer according to claim 3, wherein the distributing plate comprises: a third mixed fuel supplying hole communicating with the second mixed fuel supplying hole; a third fuel inlet communicating with the second fuel inlet; and a second gasket adapted to isolate the distributing chamber, the third mixed fuel supplying hole, and the third fuel inlet from one another; and
   wherein the combustion plate comprises: a fourth mixed fuel supplying hole communicating with the third mixed fuel supplying hole; a first discharging hole adapted to discharge reaction gas produced by a reaction of the oxidizing agent and the fuel in the combustion chamber; and a third gasket adapted to isolate the combustion chamber from the fourth mixed fuel supplying hole.

5. The plate type reformer according to claim 4, wherein the reforming reaction plate comprises: a second discharging hole communicating with the first discharging hole; a hydrogen gas discharging hole adapted to discharge the hydrogen gas generated by the reforming reaction in the reforming chamber; and a fourth gasket adapted to isolate the second discharging hole from the reforming reaction chamber.

6. The plate type reformer according to claim 5, wherein the heating plate comprises a second hydrogen gas discharging hole communicating the hydrogen gas discharging hole, and a fifth gasket adapted to isolate the channel from the second hydrogen gas discharging hole.

7. The plate type reformer according to claim 1, wherein the reforming catalyst layer comprises grain catalysts.

8. The plate type reformer according to claim 7, wherein the fourth mixed fuel supplying hole and the hydrogen gas discharging hole comprise a mesh adapted to prevent the grain catalysts from scattering.

9. The plate type reformer according to claim 2, wherein the reforming catalyst layer comprises grain catalysts.

10. The plate type reformer according to claim 9, wherein the fourth mixed fuel supplying hole and the hydrogen gas discharging hole comprise a mesh adapted to prevent the grain catalysts from scattering.

11. The plate type reformer according to claim 1, wherein the reforming catalyst layer comprises washcoated catalysts.

12. The plate type reformer according to claim 2, wherein the reforming catalyst layer comprises washcoated catalysts.

13. The plate type reformer according to claim 2, wherein each of the at least two branches of the second end having a first mixed fuel supplying hole, the mixed fuel flowing into the reforming reaction plate through the first mixed fuel supplying hole;
  the distributing plate comprises an inlet introducing the oxidizing agent in one side of the distributing chamber, and a second mixed fuel supplying hole communicating with the first mixed fuel supplying hole;
  the combustion plate comprises an inlet and a corresponding outlet arranged in opposite sides of the combustion chamber, and a third mixed fuel supplying hole communicating with the second mixed fuel supplying hole; and
  the reforming reaction chamber communicating with the third mixed fuel supplying hole, and the reforming reaction chamber including a discharging hole discharging reformed hydrogen gas.

14. The plate type reformer according to claim 13, wherein the first mixed fuel supplying hole, the second mixed fuel supplying hole and the third mixed fuel supplying hole respectively comprise a plurality of first mixed fuel supplying holes, second mixed fuel supplying holes and third mixed fuel supplying holes.

15. The plate type reformer according to claim 13, wherein the cover plate, the preheating plate, the distributing plate, the combustion plate and the reforming reaction plate are attached to one another by welded edges thereof.

16. The plate type reformer according to claim 14, wherein the cover plate, the preheating plate, the distributing plate, the combustion plate and the reforming reaction plate are attached to one another by welded edges thereof.

17. The plate type reformer according to claim 13, wherein the reforming catalyst comprises grain catalysts.

18. The plate type reformer according to claim 17, wherein the third mixed fuel supplying hole comprises a mesh arranged in the discharging hole thereof and adapted to prevent the grain catalysts from scattering.

19. The plate type reformer according to claim 14, wherein the reforming catalyst layer comprises grain catalysts.

20. The plate type reformer according to claim 19, wherein the third mixed fuel supplying hole comprises a mesh arranged in the discharging hole thereof and adapted to prevent the grain catalysts from scattering.

21. The plate type reformer according to claim 13, wherein the reforming catalyst layer comprises washcoated catalysts.

22. The plate type reformer according to claim 14, wherein the reforming catalyst layer comprises washcoated catalysts.

23. The plate type reformer according to claim 13, further comprising another plate type reforming reactor disposed below the heating plate, another plate type combustion reactor disposed below the another plate type reforming reactor, and another plate type preheater disposed below the another plate type combustion reactor.

24. A fuel cell system, comprising:
  a reformer adapted to generate hydrogen gas from fuel containing hydrogen by a chemical catalyst reaction due to heat energy;
  at least one power generator to generate electrical energy by an electrochemical reaction of the hydrogen gas and oxygen;
  a fuel source to supply the fuel to the reformer; and
  an oxidizing agent source to supply an oxidizing agent to the power generator,
  the reformer comprising:
    a plate type combustion reactor including a distributing plate having a distributing chamber having a plurality of distributing holes, and a combustion plate including a combustion chamber having an oxidizing catalyst layer, the combustion chamber being connected to the distribution chamber through the distributing holes, an oxidizing agent supplied to the distributing chamber being supplied to the combustion chamber through the distributing holes, the combustion chamber generating heat energy from reaction of the oxidizing agent and a fuel, the plurality of distributing holes being uniformly dispersed in the distributing chamber;
    a plate type preheater disposed above the plate type combustion reactor and including a channel, the plate type preheater being preheated by the heat energy generated in the plate type combustion reactor, the plate type preheater comprising a preheating plate and a cover plate, the channel of the plate type preheater being formed on a first side of the preheating plate, the cover plate contacting the first side of the preheating plate and defining a passage with the channel, the channel having a first end and a second end, a mixed fuel of fuel and water being introduced into the channel through the first end and flowing to the second end through the passage, the second end having at least two branches, the mixed fuel of fuel and water flowing into the distributing plate at the at least two branches;
    a plate type reforming reactor disposed below the plate type combustion reactor and having a reforming catalyst layer to generate hydrogen gas from the mixed fuel supplied from the plate type preheater, the plate type reforming reactor being heated by the heat energy generated in the plate type combustion reactor; and
    a heating plate disposed below the plate type reforming reactor and including a channel, a reaction gas of the oxidizing agent and the fuel being supplied to the channel of the heating plate from the combustion chamber, the reaction gas flowing through the channel of the heating plate transferring heat energy of the reaction gas to the plate type reforming reactor.

25. The fuel cell system according to claim 24, wherein the plate type reforming reactor comprises a reforming reaction plate having a reforming reaction chamber including the reforming catalyst.

26. The fuel cell system according to claim 25, wherein the cover plate comprises: a first oxidizing agent inlet adapted to introduce the oxidizing agent; a first mixed fuel supplying hole adapted to supply the mixed fuel to the channel of the preheating plate; and a first fuel inlet through adapted to supply the fuel to the combustion plate; and
  wherein the preheating plate comprises: a second oxidizing agent inlet communicating with the first oxidizing agent inlet and adapted to supply the oxidizing agent to the distributing chamber of the distributing plate; a second mixed fuel supplying hole arranged at each of the at least two branches of the second end of the channel and adapted to supply the mixed fuel introduced in the channel to the reforming reaction plate; a second fuel inlet communicating with the first fuel inlet and adapted to supply the fuel to the combustion plate; and a first gasket adapted to isolate the second oxidizing agent inlet, the channel, and the second fuel inlet from one another.

27. The fuel cell system according to claim 26, wherein the distributing plate comprises: a third mixed fuel supplying hole communicating with the second mixed fuel supplying hole; a third fuel inlet communicating with the second fuel inlet; and a second gasket adapted to isolate the distributing chamber, the third mixed fuel supplying hole, and the third fuel inlet from one another; and wherein the combustion plate comprises: a fourth mixed fuel supplying hole communicating with the third mixed fuel supplying hole; a first discharging hole adapted to discharge reaction gas produced by a reaction of the oxidizing agent and the fuel in the combustion chamber; and a third gasket adapted to isolate the combustion chamber from the fourth mixed fuel supplying hole.

28. The fuel cell system according to claim 27, wherein the reforming reaction plate comprises: a second discharging hole communicating with the first discharging hole; a hydrogen gas discharging hole adapted to discharge the hydrogen gas generated by the reforming reaction in the reforming chamber; and a fourth gasket adapted to isolate the second discharging hole from the reforming reaction chamber.

29. The fuel cell system according to claim 26, wherein the heating plate comprises a second hydrogen gas discharging hole communicating the hydrogen gas discharging hole, and a fifth gasket adapted to isolate the channel from the second hydrogen gas discharging hole.

30. The fuel cell system according to claim 24, wherein the reforming catalyst layer comprises grain catalysts.

31. The fuel cell system according to claim 30, wherein the fourth mixed fuel supplying hole and the hydrogen gas discharging hole comprise a mesh adapted to prevent the grain catalysts from scattering.

32. The fuel cell system according to claim 25, wherein the reforming catalyst layer comprises grain catalysts.

33. The fuel cell system according to claim 32, wherein the fourth mixed fuel supplying hole and the hydrogen gas discharging hole comprise a mesh adapted to prevent the grain catalysts from scattering.

34. The fuel cell system according to claim 24, wherein the reforming catalyst layer comprises washcoated catalysts.

35. The fuel cell system according to claim 25, wherein the reforming catalyst layer comprises washcoated catalysts.

36. The fuel cell system according to claim 25, wherein each of the at least two branches of the second end having a first mixed fuel supplying hole, the mixed fuel flowing into the reforming reaction plate through the first mixed fuel supplying hole;

the distributing plate comprises an inlet introducing the oxidizing agent in one side of the distributing chamber, and a second mixed fuel supplying hole communicating with the first mixed fuel supplying hole;

the combustion plate comprises an inlet and a corresponding outlet arranged in opposite sides of the combustion chamber, and a third mixed fuel supplying hole communicating with the second mixed fuel supplying hole; and the reforming reaction chamber communicating with the third mixed fuel supplying hole, and the reforming reaction chamber including a discharging hole discharging reformed hydrogen gas.

37. The fuel cell system according to claim 36, wherein the first mixed fuel supplying hole, the second mixed fuel supplying hole and the third mixed fuel supplying hole respectively comprise a plurality of first mixed fuel supplying holes, second mixed fuel supplying holes and third mixed fuel supplying holes.

38. The fuel cell system according to claim 36, wherein the cover plate, the preheating plate, the distributing plate, the combustion plate and the reforming reaction plate are attached to one another by welded edges thereof.

39. The fuel cell system according to claim 37, wherein the cover plate, the preheating plate, the distributing plate, the combustion plate and the reforming reaction plate are attached to one another by welded edges thereof.

40. The fuel cell system according to claim 36, wherein the reforming catalyst comprises grain catalysts.

41. The fuel cell system according to claim 40, wherein the third mixed fuel supplying hole comprises a mesh arranged in the discharging hole thereof and adapted to prevent the grain catalysts from scattering.

42. The fuel cell system according to claim 36, wherein the reforming catalyst layer comprises washcoated catalysts.

43. The fuel cell system according to claim 36, further comprising another plate type reforming reactor disposed below the heating plate, another plate type combustion reactor disposed below the another plate type reforming reactor, and another plate type preheater disposed below the another plate type combustion reactor.

* * * * *